Figure 3:
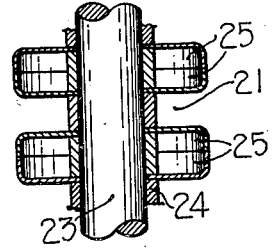

Oct. 30, 1934.    F. A. THOMANN    1,978,888
COTTON HARVESTER
Filed Jan. 29, 1934

WITNESS
Walter Ackerman

INVENTOR
Frederick A. Thomann
BY Brown, Jackson, Boettcher & Dienner
ATTORNEYS.

Patented Oct. 30, 1934

1,978,888

UNITED STATES PATENT OFFICE 1,978,888

COTTON HARVESTER

Frederick A. Thomann, East Moline, Ill., assignor to Deere & Company, Moline, Ill., a corporation of Illinois Application January 29, 1934, Serial No. 708,796

6 Claims. (Cl. 56—33)

The present invention relates generally to cotton harvesters and similar agricultural implements, and has for its principal object the provision of new and improved means for removing the cotton from the cotton plants as the machine is drawn along a plant row.

More specifically, the present invention is principally concerned with harvesters in the form of implements having cotton stripping mechanism which comprises a downwardly and forwardly extending stripping means in the form of a roll or rolls provided with a plurality of fingers which, when the roll is rotated, serve to remove cotton from the plants as the latter are brought into the operative range of the stripping roll.

Another important object of the present invention is the provision of new and improved means for removing the cotton, stripped from the cotton plants by the stripping mechanism, from the stripping roll. Heretofore, the cotton has been stripped from the stripping roll by various means, such as a slotted stripping plate, through the slots of which the stripping roll fingers passed, the plate functioning to strip the cotton from the fingers of said stripping roll. A machine having these general characteristics is disclosed in my copending application, Serial No. 430,731, filed February 24, 1930, and I do not intend to claim here any of the features claimed in said copending application.

Briefly, such new and improved stripping or doffing means consists of a rotary doffing member rather than a stripping plate, and this rotary doffing member preferably comprises a roll of substantially the same size as the stripping roll with which it cooperates, the rotary doffing roll having a series of circumferential grooves provided for the purpose of receiving the fingers of the stripping roll. The function of the doffing roll is to strip the cotton from the fingers of the stripping roll and to transfer the cotton to an elevator or the like disposed along one side for conveying the stripped cotton to a hopper or preliminary cleaning mechanism. It has been found that the rotary doffing roll performs its function remarkably well and does not clog or choke up the machine.

Another object of the present invention is the provision of means for driving the doffing roll at a somewhat greater peripheral velocity than, but in the same direction of rotation as the stripping roll. By virtue of this construction, the machine is kept clear.

These and other objects of the present invention will be apparent to those skilled in the art after a consideration of the following detailed description of a construction embodying the principles of the present invention.

Figure 1:
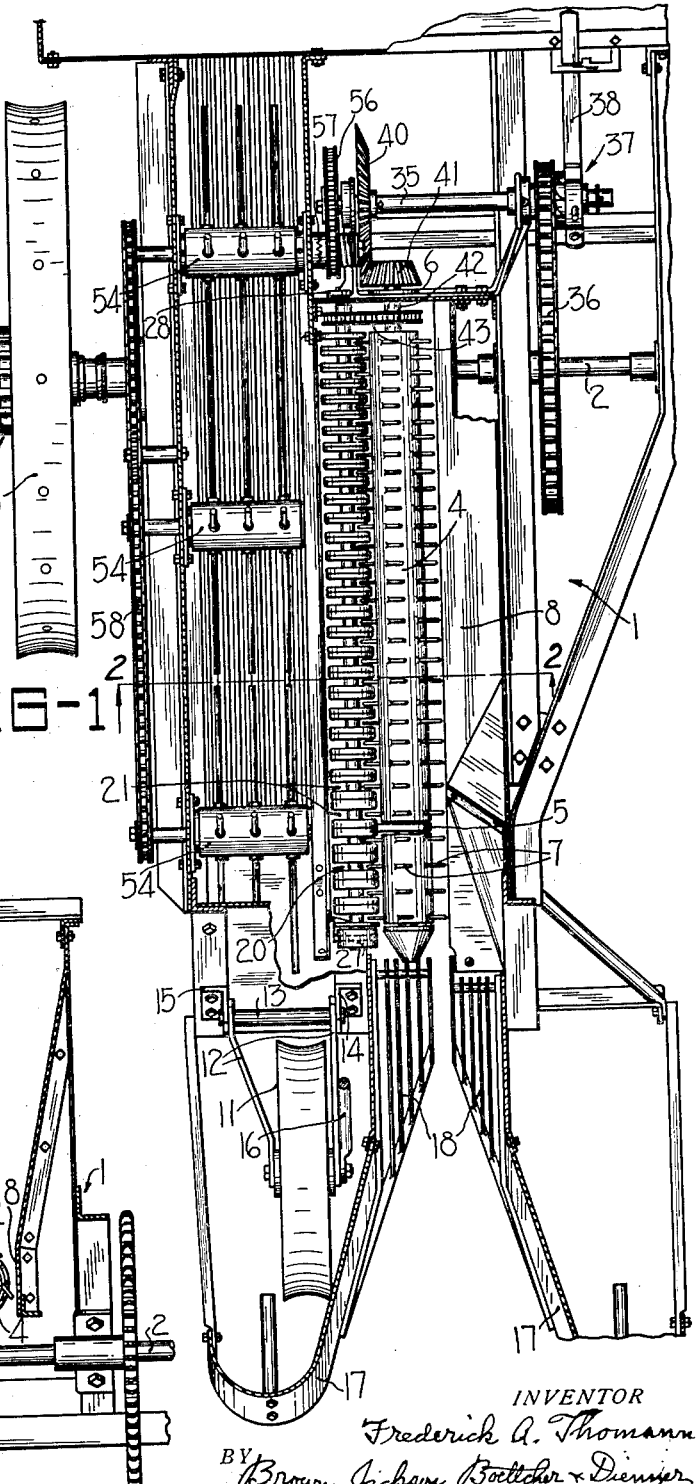
Figure 2:
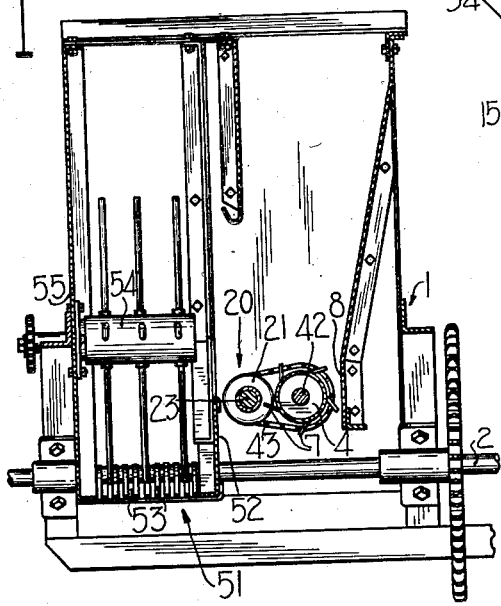

In the drawing:

Figure 1 is a top plan view of a horse-drawn cotton harvester embodying the principles of the present invention Figure 2 is a cross section taken along the line 2—2 of Figure 1 and looking in the direction of the arrows; and Figure 3 is an enlarged fragmentary section showing the construction of the doffing roll.

Referring now to the drawing, the invention has been illustrated as applied to a horse-drawn cotton stripper, such as the one shown in the patent to Bruce Morse, No. 1,933,922, issued November 7, 1933. The cotton stripper illustrating the principles of the present invention embodies a frame 1 supported on a driving axle 2 on the outer ends of which are journaled supporting wheels. In the drawing, only one of such wheels has been shown and that has been indicated by the reference numeral 3.

The cotton stripping mechanism embodies a stripping roll 4 supported in bearings 5 and 6 on the frame 1 and provided with a plurality of rows of stripping fingers 7 which are inclined in a direction opposite to the direction of rotation of the roll, as indicated in Figure 2, where the arrow indicates the direction of rotation of the stripping roll 4. As best indicated in Figure 2, the stripping roll fingers 7 cooperate with a smooth wall 8 carried by the frame 1 and positioned alongside the stripping roll 4 in close proximity thereto.

The front end of the machine is supported on a gauge wheel 11 journaled for rotation between a pair of arms 12 fixed on a rock shaft 13 which is journaled in bearings 14 and 15 secured to the front end of the frame 1 of the machine, as best shown in Figure 1. The position of the front end of the machine relative to the ground may be adjusted by rocking the wheel 11 about the axis of the rock shaft 13 relative to the frame, and to this end the machine is provided with suitable control connections, including a link 16, by which the position of the gauge wheel 11 may be varied at will.

For guiding the cotton plants toward the stripping roll 4, a pair of hooded shoes 17 are pivotally connected with the forward end of the frame, and the inner walls of the shoes 17 are directed inwardly to guide the cotton plants between the stripping roll 4 and the cooperating wall 8. Along the lower edge of the shoes 17 are fixed grates 18 for aiding in picking loose cotton off the ground and directing the same toward the stripping roll 4.

The cotton removed from the plants by the stripping roll 4 is, in turn, stripped from the stripping roll fingers 7 by means of a doffing member in the form of a rotatable doffing roll 20. The doffing roll member 20 is preferably of about the same diameter as the stripping roll 4 and is provided with a circumferential recess 21 opposite each circumferential or transverse row of fingers 7 on the stripping roll 4. As best shown in Figure 1, the fingers 7 of each row project into the associated recess on the doffing roll, and, as also best shown in Figure 1, the distance between adjacent rows of fingers 7 progressively decreases toward the rear and upper end of the stripping roll 4, and likewise, the distance between adjacent recesses 21 on the doffing roll also progressively decreases correspondingly.

The construction of the doffing roll 20 is best indicated in Figure 3 and comprises a shaft 23 having a series of rings 24 mounted thereon. Pairs of cups 25 are positioned on the shaft 23 to form, in effect, a smooth cylindrical roll with a series of circumferential recesses between adjacent pairs, as indicated by the reference numeral 21. Each of the cups 25 comprises a central portion fitting the shaft 23 and a flange or rim portion, and the cups of each pair are mounted on the shaft so that the rims are in engagement, as indicated in Figure 3. The axial dimension of the rims of the pairs of cups 25 vary, as indicated in Figure 1, so as to provide for the progressive decrease in the distance between adjacent transverse rows of fingers 7 on the stripping roll towards the upper end of the latter. The doffing roll shaft 23 is journaled in a bearing 27 at the lower end of the frame and in a bearing 28 at the upper end of the frame of the machine.

The mechanism including the stripping roll 4 and the doffing roll 20 is operated from power derived from the driving axle 2 which is rotated through more or less conventional ratchet mechanism 34 provided for each driving wheel 3. The axle 2 carries a large sprocket and drives a jack shaft 35 by means of a chain 36 trained over the aforesaid sprocket and a small sprocket mounted on the jack shaft 35. The small sprocket is connected to the jack shaft 35 through a releasable clutch construction 37 which is adapted to be controlled by a shiftable lever 38. The jack shaft 35 drives the stripping roll 4 by means of a bevel gear 40, fixed to the jack shaft 35, which meshes with a bevel pinion 41 fixed to the upper end of a shaft 42 on which the stripping roll 44 is mounted. The doffing roll 20 is driven from the stripping roll by means of a chain and sprocket connection 43 with the stripping roll shaft 42.

Disposed alongside the doffing roll 20 and carried in any suitable manner by the implement frame 1, is a longitudinally disposed trough 51, best shown in Figure 2, which is provided with an inner wall 52 disposed closely adjacent to the doffing member 20. The bottom of the trough 51 is slotted, as indicated at 53, to permit foreign matter such as sand, dirt, and the like, to fall through onto the ground. A series of rotating elevating members 54 are rotatably mounted in the outer wall 55 of the trough or casing and function to convey the cotton delivered into the trough 51 to the rear of the machine and into a receptacle, or other cotton-treating mechanism, as may be provided. The number of these rotating elevating members may vary, as desired, three being shown in Figure 1. The rear elevating member 54 is driven from the jack shaft 35 through a chain and sprocket connection 56 and a slip clutch 57, and the forward elevating members 54 are operated from the rear elevating member by means of a chain and sprocket connection 58 with the rear member.

The operation of the machine described above, and embodying the principles of the present invention, is substantially as follows. As the machine is propelled along a plant row, the rotation of the supporting wheels 3 drives the jack shaft 35 through the chain and sprocket connection 36, and the rotation of the jack shaft 35 drives the stripping roll 4 through the bevel gearing 40, 41. The rotation of the stripping roll causes the doffing roll member 20 to rotate in the same direction, and the rotation of the doffing roll serves to remove the cotton from the fingers 7 of the stripping roll and to convey the cotton over the inner wall 52 of the trough 51. The cotton in the trough 51 is conveyed and simultaneously given a preliminary cleaning by the rotating elements 54 which are driven by the chain and sprocket connections 56 and 58. The mechanism is thrown in and out of operation by the lever 38, and the slip clutch 57 serves to protect the mechanism in the event that the rotating members 54 are subjected to an overload. Likewise, the clutch 37 may include an overload release, if desired, to protect the rolls 4 and 20.

While I have described above the preferred construction in which the principles of the present invention have been embodied, it is to be understood that my invention is not to be limited to the specific details shown and described, but that, in fact, widely different means may be employed in the practice of the broader aspects of my invention.

What I claim, therefore, and desire to secure by Letters Patent is:

1. In a cotton harvesting machine, row-following plant stripping means comprising a stripping roll having fingers thereon for stripping cotton from plants guided to said roll, a doffing roll disposed adjacent to said stripping roll and having a plurality of recessed sections into which said fingers project as the stripping roll is rotated, and means for rotating said rolls.

2. In a cotton harvesting machine, row-following plant stripping means comprising a stripping roll having fingers thereon for stripping cotton from plants guided to said roll, a doffing roll disposed adjacent to said stripping roll and having a plurality of grooves arranged to receive said fingers as the stripping roll is rotated, and means for driving the doffing roll in the same direction as but at a greater peripheral velocity than said stripping roll.

3. In a cotton harvesting machine, row-following plant stripping means comprising a stripping roll having fingers thereon for stripping cotton from plants guided to said roll, a doffing roll disposed adjacent to said stripping roll and having a plurality of grooves arranged to receive said fingers as the stripping roll is rotated, means for driving one of said rolls, and means for driving the other roll from said one roll at a different peripheral velocity.

4. In a cotton harvesting machine, row-following plant stripping means comprising a stripping roll having fingers thereon disposed in transverse axially spaced rows for stripping cotton from plants guided to said roll, a doffing roll disposed substantially parallel to said stripping roll and having a plurality of circumferential recesses, one opposite each row of fingers, into which the fingers of the row successively project as the stripping roll is rotated, and means for rotating said rolls in the same direction.

5. In a cotton harvesting machine, row-following plant stripping means comprising a pair of cooperating members, means for guiding cotton plants between said members as said machine is advanced, one of said members comprising a downwardly and forwardly inclined stripping roll having fingers thereon disposed in transverse axially spaced rows cooperating with the other member to strip cotton from the plants guided therebetween, a doffing roll disposed alongside said roll on the side opposite said other member and provided with a series of circumferential recesses, one for each transverse row of fingers, into which the fingers project in the operation of the machine, and means for rotating said rolls in the same direction.

6. In a cotton harvesting machine, row-following plant stripping means comprising a pair of cooperating members, means for guiding cotton plants between said members as said machine is advanced, one of said members comprising a downwardly and forwardly inclined stripping roll having fingers thereon disposed in transverse axially spaced rows cooperating with the other member to strip cotton from the plants guided therebetween, a doffing roll disposed alongside said roll on the side opposite said other member and provided with a series of circumferential recesses, one for each transverse row of fingers, into which the fingers project in the operation of the machine, means providing a cotton receiving passageway extending alongside, cotton elevating means movable in said passageway, and means for rotating both of said rolls and said elevating means simultaneously.

FREDERICK A. THOMANN.